United States Patent
Zhang et al.

(10) Patent No.: US 10,343,351 B2
(45) Date of Patent: Jul. 9, 2019

(54) FIBER-REINFORCED COMPOSITES MADE WITH MULTI-PART THERMOPLASTIC POLYMERS

(71) Applicant: JOHNS MANVILLE, Denver, CO (US)

(72) Inventors: Mingfu Zhang, Highlands Ranch, CO (US); Asheber Yohannes, Littleton, CO (US); Jawed Asrar, Englewood, CO (US)

(73) Assignee: Johns Manville, Denver, CO (US)

( * ) Notice: Subject to any disclaimer, the term of this patent is extended or adjusted under 35 U.S.C. 154(b) by 826 days.

(21) Appl. No.: 14/847,222

(22) Filed: Sep. 8, 2015

(65) Prior Publication Data

US 2017/0066200 A1    Mar. 9, 2017

(51) Int. Cl.
*C08J 5/04*     (2006.01)
*C08J 5/24*     (2006.01)
*B29C 67/24*    (2006.01)
*B29C 70/48*    (2006.01)
*B29K 33/00*    (2006.01)
*B29K 67/00*    (2006.01)
(Continued)

(52) U.S. Cl.
CPC ............ *B29C 67/246* (2013.01); *B29C 70/48* (2013.01); *C08J 5/043* (2013.01); *C08J 5/24* (2013.01); *D06M 15/327* (2013.01); *D06M 15/59* (2013.01); *D06M 23/16* (2013.01); *B29K 2033/12* (2013.01); *B29K 2067/006* (2013.01); *B29K 2067/04* (2013.01); *B29K 2077/00* (2013.01); *B29K 2105/0872* (2013.01); *B29K 2309/08* (2013.01); *B29L 2031/082* (2013.01); *B29L 2031/30* (2013.01); *C08J 2333/12* (2013.01); *C08J 2377/02* (2013.01); *C08J 2433/12* (2013.01); *C08J 2477/02* (2013.01); *D06M 2101/00* (2013.01)

(58) Field of Classification Search
USPC ........................................................ 427/385.5
See application file for complete search history.

(56) References Cited

U.S. PATENT DOCUMENTS 8,883,908 B2    11/2014   Gleich et al.
2010/0062238 A1  3/2010   Doyle et al.
(Continued)

FOREIGN PATENT DOCUMENTS

DE    10 2011 006372 A1   10/2012
WO    2013/056845 A2      4/2013

*Primary Examiner* — Lynda Salvatore
(74) *Attorney, Agent, or Firm* — Robert D. Touslee (57) ABSTRACT

Methods of making fiber reinforced composite articles are described. The methods may include the step of providing a pre-impregnated fiber-containing thermoplastic material to a mold for the article. The pre-impregnated fiber-containing thermoplastic material may include: (i) a plurality of fibers, and (ii) a first thermoplastic polymer made from a first reactive thermoplastic resin. Reactants of a second reactive thermoplastic resin may be introduced to fill open spaces in the mold that are left by the pre-impregnated fiber-containing thermoplastic material. The second reactive thermoplastic resin may then be polymerized to form a second thermoplastic polymer. The final fiber reinforced composite article includes at least two spatially distinct regions of thermoplastic polymer.

46 Claims, 4 Drawing Sheets

(51) Int. Cl.
*B29K 77/00* (2006.01)
*B29L 31/08* (2006.01)
*B29L 31/30* (2006.01)
*D06M 15/59* (2006.01)
*D06M 23/16* (2006.01)
*B29K 105/08* (2006.01)
*B29K 309/08* (2006.01)
*D06M 101/00* (2006.01)
*D06M 15/327* (2006.01)

(56) References Cited

U.S. PATENT DOCUMENTS

| | | |
|---|---|---|
| 2010/0286343 A1 | 11/2010 | Burghardt et al. |
| 2011/0021737 A1* | 1/2011 | Tadepalli ............... B29C 70/36 528/26 |
| 2015/0144253 A1 | 5/2015 | Zhang et al. |
| 2015/0148485 A1 | 5/2015 | Yohannes et al. |
| 2015/0148498 A1 | 5/2015 | Block et al. |

* cited by examiner

FIBER-REINFORCED COMPOSITES MADE WITH MULTI-PART THERMOPLASTIC POLYMERS

BACKGROUND OF THE INVENTION

The utility of fiber-reinforced plastic composites as a material for equipment components has been widely recognized. These componets are often lighter, less prone to corrosion, and less expensive than comparable parts made of metal. They are particularly suited for transportation and power generation equipment where their low density and high corrosion resistance are harnessed to make more energy efficient automobiles and lower maintainece wind turbines. However, making components out of fiber-reinforced plastic composites still has many challenges.

For components that are regularly exposed to severe weather, jaring vibrations, and significant impacts, toughness and repairability are an important concern. Fiber-reinforced composites made using traditional thermoset polymers are well regarded for their strength and corrosion resistance, but poorly regarded for being prone to cracking and shattering with little opportunity to make meanful repairs. When critical cracks or fractures are discovered in such a thermoset part, they normally must be replaced instead of repaired, and virtually no materials from the damaged part can be recycled into new components.

The shortcomings with fiber-reinforced composite parts made using thermoset plastics has prompted many industries to consider thermoplastic substitutes. Unlike thermoset polymers, thermoplastics are meltable, allowing cracks and breaks to be repaired, and recycleable when a component is beyond repair or has reached the end of its useful life. Thermoplastics can also be more easily engineered to give a part increased fracture toughness that reduces the frequency of cracks or breaks.

The benefits of fiber-reinforced thermoplastic composite parts are counterbalanced by increased difficulties in making components from thermoplastics. Traditionally thermoplastic composites are made by compounding thermoplastic polymer resins with chopped fibers and injection molding. However, the resulting thermoplastic composites have limited mechanical strength due to the short fiber lengths. The molten thermoplastic polymers are typically more viscous than the pre-reacted components used to make thermoset polymers, which makes them significantly more challenging to adequately impregnate continuous fibers such as woven fabrics. The high melt viscosity of the thermoplastic polymers prevents them from being used in conventional liquid molding processes, such as resin infusion processes and resin transfer molding processes that are often used to make structural parts from lower-viscosity thermoset resins. Thermoplastic polymers with high melting points also require high temperature molding equipment that can be difficult to operate and more prone to breakdown.

One approach to addressing the viscosity problems with thermoplastic polymer melts has been to use reactive thermoplastic resins that introduce the low-viscosity pre-polymerized reactants to the mold and have them polymerize in situ. In this way reactive thermoplastic resins can be processed using similar techniques as thermoset resins, but once polymerized give the component the repairability and recyclability properties of a conventional fiber-reinforced thermoplastic composite.

While reactive thermoplastic resins can solve the high viscosity problems experienced with conventional thermoplastic polymer melts, they have challenges of their own. Currently, there are fewer classes of reactive thermoplastic resins when compared to conventional thermoplastic polymer resins. Many reactive thermoplastic resins have their own challenges in the polymerization step. For example, caprolactam-based polyamide-6 resin has the advantages of water-like viscosity of raw material (molten caprolactam) and fast polymerization. However, the anionic polymerization of caprolactam to form polyamide-6 is very sensitive to moisture. Keeping a manufacturing system moisture-free is extremely challenging for processing large composite parts such as wind turbine blades. In another example, reactive thermoplastic resins that include methyl methacrylate (MMA) have to contend with highly exothermic polymerization reaction of MMA to form polymethyl methacrylate (PMMA). The heat released from the MMA polymerization reaction can quickly raise the temperature of the resin above the boiling point of the MMA (~101° C.), causing many processing problems. These problems are especially severe for the manufacture of large composite parts that require large amounts of the reactive MMA resin. These and other challenges are addressed by the present invention.

BRIEF SUMMARY OF THE INVENTION

Manufacturing methods and products are described for fiber-reinforced composite articles that include a multi-component polymerized thermoplastic resin matrix. The methods of making the composite articles may include providing a pre-impregnated fiber-containing material comprising an already-polymerized first thermoplastic polymer to a mold for an article made of the composite. The first thermoplastic polymer may be produced from the first reactive thermoplastic resin and function as a resin matrix for a pre-impregnated fiber-containing thermoplastic material. Exemplary pre-impregnated materials include fibrous substrates such as glass fabrics. After the pre-impregnated materials are provided to the mold, reactants for a second reactive thermoplastic resin may be supplied to fill interstitial spaces left by the pre-impregnated material as well as other empty regions of the mold. The mold may then be heated to a polymerization temperature for the second reactive thermoplastic resin to permit the reactants to polymerize and form the fiber-reinforced composite article.

Incorporating the first thermoplastic polymer into the mold with a pre-impregnated fiber-containing material avoids many of the requirements for controlling the polymerization conditions inside the mold. For example, instead of trying to remove all moisture in the mold to facilitate the anionic polymerization of caprolactam, the caprolactam can be pre-polymerized in a more easily and precisely controlled manufacturing environment for the pre-impregnated material. Exemplary methods of producing a pre-impregnated thermoplastic material are described in co-assigned U.S. patent application Ser. No. 14/794,634, filed Jul. 8, 2015; and U.S. patent application Ser. No. 14/845,007, filed Sep. 3, 2015, the entire contents of which are hereby incorporated by reference for all purposes. When the pre-impregnated material is used, the amount of reactive thermoplastic resin needed to fill the mold may be significantly reduced. Thus, the challenge of controlling polymerization reaction of a reactive thermoplastic resin is correspondingly reduced.

Examples of the present methods and articles include polymerizing one or more types of reactive thermoplastic resins in separate processing steps to produce fiber-reinforced thermoplastic composite articles. This provides opportunities to use reactive thermoplastic resins that may otherwise be difficult or outright unsuitable if all the reactive thermoplastic resins needed are polymerized in a single step to make the composite article. For example, making large fiber-reinforced composites exclusively from a reactive thermoplastic resin like methyl methacrylate (MMA) can be difficult due to its highly exothermic polymerization reaction that can quickly raise the temperature inside the mold above acceptable limits. Exceeding a high temperature limit is especially problematic for MMA because the methyl methacrylate monomer reactants have a relatively low boiling point (~101° C.) and are prone to vaporizing in the mold. In contrast, when the methyl methyacrylate reactants are combined with a pre-impregnated fiber-containing thermoplastic material in the mold, less reactant is required and a portion of the thermal energy from the exothermic polymerization reaction can be absorbed by the pre-impregnated material. Under these circumstances, methyl methacrylate (MMA)-based resin becomes an attractive choice as an inexpensive reactive thermplastic resin for fiber-reinforced composite articles.

There are advantages to using the present methods to make fiber-reinforced composite articles where the multi-component polymerized thermoplastic resin matrix uses a single type of thermoplastic polymer. For example, the multi-component polymerized thermoplastic resin matrix may be made from one type of polymethyl methacrylate polymer with spatially distinct regions depending on whether the polymer was part of a pre-impregnated material or introduced as a second reactive thermoplastic resin. Because a significant portion of the polymethyl methacrylate polymer is placed in the mold as resin matrix of a pre-impregnated fiber-containing material, significantly less amount of reactive methyl methacrylate monomer resin is needed to fill the mold, and therefore the excess heat from the polymerization of the methyl methacrylate monomers in the mold is much more manageable.

Exemplary embodiments of the present methods include methods of making fiber reinforced composite articles. The methods may include the step of providing a pre-impregnated fiber-containing thermoplastic material to a mold for the article. The pre-impregnated fiber-containing thermoplastic material may include: (i) a plurality of fibers, and (ii) a first thermoplastic polymer made from a first reactive thermoplastic resin. Reactants of a second reactive thermoplastic resin may be introduced to fill open spaces in the mold that are left by the pre-impregnated fiber-containing thermoplastic material. The second reactive thermoplastic resin may then be polymerized to form a second thermoplastic polymer.

Additional exemplary embodiments of methods of making fiber-reinforced thermoplastic composite articles may include the step of providing a pre-impregnated fiber-containing thermoplastic material to a mold. The pre-impregnated fiber-containing thermoplastic material may include (i) a plurality of glass fibers, and (ii) a polyamide polymer made from a reactive lactam resin. Reactants of a reactive thermoplastic resin may be introduced to fill open spaces in the mold that are left by the pre-impregnated fiber-containing thermoplastic material. The reactive thermoplastic resin may then be polymerized to form a thermoplastic polymer.

Still further exemplary embodiments of methods of making fiber-reinforced thermoplastic composite articles may include the step of providing a pre-impregnated fiber-containing thermoplastic material to a mold. The pre-impregnated fiber-containing thermoplastic material may include (i) a plurality of glass fibers, and (ii) a polymethyl methacrylate polymer made from a reactive methyl methacrylate resin. Reactants of a reactive thermoplastic resin may be introduced to fill open spaces in the mold that are left by the pre-impregnated fiber-containing thermoplastic material. The reactive thermoplastic resin may then be polymerized to form a thermoplastic polymer.

Exemplary embodiments further include fiber-reinforced composite articles. The articles may include (i) a plurality of fibers, and (ii) a polymerized thermoplastic resin matrix made from: (a) a first thermoplastic polymer in contact with the plurality of fibers, and (b) a second thermoplastic polymer. The first and second thermoplastic polymers have spatially distinct regions in the polymerized thermoplastic resin matrix.

Additional embodiments and features are set forth in part in the description that follows, and in part will become apparent to those skilled in the art upon examination of the specification or may be learned by the practice of the invention. The features and advantages of the invention may be realized and attained by means of the instrumentalities, combinations, and methods described in the specification.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and follows a hyphen to denote one of multiple similar components. When reference is made to a reference numeral without specification to an existing sublabel, it is intended to refer to all such multiple similar components.

DETAILED DESCRIPTION OF THE INVENTION

The present methods of making fiber-reinforced composite articles introduce both an already-polymerized first thermoplastic polymer and a reactive thermoplastic resin for a second thermoplastic polymer to a mold for the composite article. The already-polymerized first thermoplastic polymer is normally part of a pre-impregnated fiber-containing thermoplastic material that has been made prior to being provided to the mold. Reactants of the reactive thermoplastic resin for the second thermoplastic polymer are introduced as a liquid that fills the interstitial spaces of the pre-impregnated fiber-containing thermoplastic material as well as other open regions in the mold. In contrast to the already-polymerized first thermoplastic polymer, the second thermoplastic polymer is formed in situ in the mold as conditions are adjusted to promote the polymerization of the reactants in the reactive thermoplastic resin.

In some examples, the first and second thermoplastic polymers are different types of polymers in addition to being in spatially distinct regions of the composite article. For example, the first thermoplastic polymer may be made of a polyamide polymer (e.g., PA-6, PA-12, copolymers or blends of PA-6 and PA-12, etc.), while the second thermoplastic polymer may be polymethyl methacrylate (PMMA). In additional examples, the first and second thermoplastic polymer may be the same type of polymer. For example, both polymers could be a polyamide polymer, a PMMA polymer, a polybutylene terephthalate polymer, or a polycycloolefin polymer, among other types of reactive thermoplastic polymers.

Figure 1:
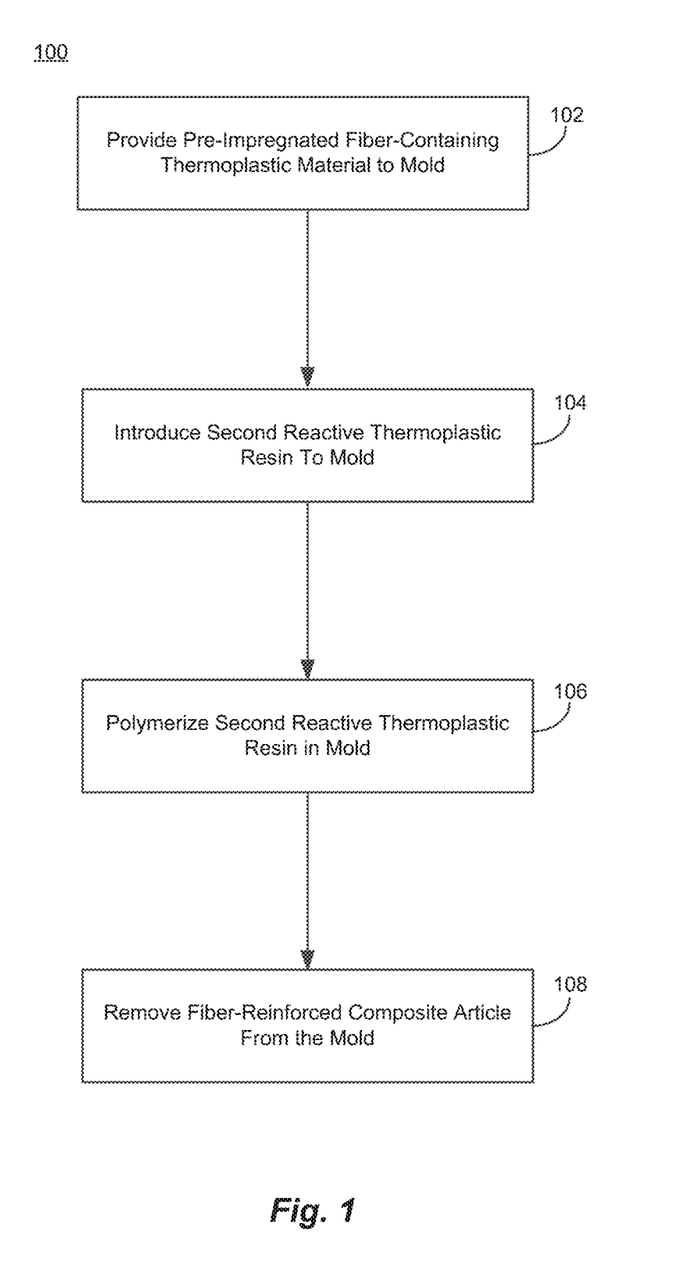
FIG. 1 is a flowchart of selected steps in a method of making a fiber-reinforced composite according to embodiments of the invention.

Referring now to FIG. 1, a flowchart of selected steps in a method 100 of making a fiber-reinforced composite is shown. The method 100 may include providing a pre-impregnated fiber-containing thermoplastic material to a mold 102. The material may include an already-polymerized thermoplastic polymer that binds together a plurality of fibers. Exemplary thermoplastic polymers include polymers made from a first reactive thermoplastic resin, where the resin includes monomeric and oligomeric reactants such as lactam monomers (e.g., caprolactam, laurolactam, etc.) to make polyamide polymers, cyclic butylene terephthalate (CBT) oligomers to make polybutylene terephthalate (PBT), and methyl methacrylate (MMA) to make polymethyl methacrylate (PMMA), among other reactive thermoplastic resins. Exemplary fibers for the material may include glass fibers, ceramic fibers, carbon fibers, metal fibers, mineral fibers, and organic polymer fibers, among other types of fibers. Shapes and sizes of the fibers may include chopped fibers (long and/or short), continuous fibers, rovings, and wound fibers, among other types of fibers. In some embodiments, the fibers may be sized with a reactive sizing composition to be reactive fibers. Additional details on the plurality of fibers are described below in the discussion of the present fiber-reinforced composites.

The plurality of fibers may be arranged into a fiber substrate such as a fiber mat, fiber fabric, rovings, etc. The fiber in fiber mats and fabrics may either be woven or nonwoven. Woven fabrics are produced by weaving multiple roving strands together. The roving strands are commonly woven so that a first plurality of strands extend in a first direction (e.g., weft direction) and a second plurality of strands extend in a second direction that is typically orthogonal to the first direction (e.g., warp direction). The first plurality of strands are roughly parallel with one another as are the second plurality of strands. The woven fabrics may be unidirectional, where all or most of the roving strands run or extend in the same direction, or may be bidirectional, wherein the roving strands run in two, typically orthogonal, directions. Various weaves may be used to form the fabrics including: plain weaves, twill weaves, satin weaves, multi-axial weaves, or stitching.

Embodiments of the plurality of fibers also include nonwoven fiber mats. The nonwoven fiber mats are commonly formed of fibers that are entangled or meshed together rather than being woven in a uniform direction. The nonwoven fiber mats exhibit more uniform strength characteristics in comparison to woven fabrics. Stated differently, the strength of the nonwoven fiber mats is typically less directionally dependent so that a more uniform strength is achieved regardless of which direction the mat is tensioned. In comparison, the strength of woven fabrics are directionally dependent whereby the fabrics exhibit substantially more strength in a direction aligned with the fibers and less strength in a direction misaligned from the fibers. Woven fabrics are substantially stronger than nonwoven mats when the tension is aligned with the fibers.

Embodiments of the pre-impregnated fiber-containing thermoplastic material may also include materials made through conventional processes such as film impregnation and powder impregnation of fibrous substrates with thermoplastic polymer films and/or powders. For example, the pre-impregnated fiber-containing material may be made by contacting the plurality of fibers with already-polymerized first thermoplastic polymer. The first thermoplastic polymer may then be heated, melted, and/or pressed with the plurality of fibers to form the integrated pre-impregnated fiber-containing thermoplastic material. The first thermoplastic polymer may contacted with the plurality of fibers as a fluid melt; or as a solid polymer in the form of powder, pellets, beads, shavings, chips, or films, among other forms.

The pre-impregnated fiber-containing thermoplastic materials may include prepreg sheets, pultruded rods, and unidirectional tapes, among other materials. Two or more forms of the material may be provided to the mold, such as a prepreg sheet and pultruded rod. The material may be arranged in the mold as stacked layers of a single form (e.g., stacked layers of prepreg sheets), alternating layers of different forms (e.g., alternating layers of prepreg sheets), and combinations of different forms (e.g., a combination of prepreg sheets and pultruded rods), among other arrangements. The pre-impregnated thermoplastic material may fill about 5% to about 95% of the volume of the mold. More exemplary filling ranges include about 10 vol % to about 90 vol. %; about 20 vol. % to about 90 vol. %; about 30 vol. % to about 90 vol. %; about 40 vol. % to about 90 vol. %, about 50 vol. % to about 90 vol. %; about 60 vol. % to about 90 vol. %; about 70 vol. % to about 90 vol. %; about 80 vol. % to about 90 vol. %; etc.

The method 100 may also include introducing reactants of a second reactive thermoplastic resin to the mold 104. The second resin is a liquid resin of relatively low viscosity compared to a melt of the ultimate thermoplastic polymer. The resin fills the interstitial spaces between the pre-impregnated fiber-containing thermoplastic material as well as other open region in the mold. As noted above, in some embodiments the second reactive thermoplastic resin may form the same type of polymer as the first thermoplastic polymer, while in additional embodiments the second resin may form a different type of polymer. Exemplary second reactive thermoplastic resins include reactive thermoplastic resin reactants such as lactam monomers (e.g., caprolactam, laurolactam, etc.) to make polyamide polymers, cyclic butylene terephthalate (CBT) oligomers to make polybutylene terephthalate (PBT), and methyl methacrylate (MMA) to make polymethyl methacrylate (PMMA), among other reactive thermoplastic resin reactants.

The second reactive thermoplastic resin may be delivered to the mold using vacuum infusion, resin transfer molding (RTM) processes (e.g., vacuum-assisted resin transfer molding or VARTM), and reaction injection molding (RIM) processes (e.g., structural reaction injection molding or SRIM), among other techniques to introduce resins to molds. It should be noted that while vacuum infusion, RTM and RIM processes are normally associated with supplying thermoset reactants to a mold, in method 100 the reactive thermoplastic resin includes reactants for thermoplastic polymers.

In some embodiments, additional fibers may be added to the mold, prior to introduction of the second reactive thermoplastic resin to the mold. The additional fibers may take the form of woven fabrics, non-woven mats, rovings, and combinations thereof. In further embodiments, the second reactive thermoplastic resin may be combined with additional fibers. The additional fibers may be mixed with the resin prior to its introduction to the mold. When additional fibers are compounded with the resin prior to its introduction to the mold, a direct long fiber thermoplastic (D-LFT) technique may be used. D-LFT techniques feed continuous fibers into an extruder where they are combined with the resin before it is supplied to the mold.

In some embodiments the additional fibers may be the same type, size and shape as the plurality of fibers used in the pre-impregnated fiber-containing thermoplastic material. In additional embodiments, the additional fibers may be different than the plurality of fibers used in the pre-impregnated fiber-containing thermoplastic material. For example, the plurality of fibers used in the pre-impregnated fiber containing thermoplastic material may be woven fabrics or rovings, and the additional fibers may be non-woven mats or chopped fibers. In still additional embodiments the additional fibers may be sized with a reactive sizing composition to be reactive fibers.

After the pre-impregnated fiber-containing thermoplastic material and the reactants of the second reactive thermoplastic resin are supplied, the mold may be configured to facilitate the polymerization of the second reactive thermoplastic resin 106. In some embodiments, the mold may be set to polymerization conditions before the second reactive thermoplastic resin is introduced. For example, the mold may be pre-heated to a polymerization temperature of the resin so the reactants start to polymerize as soon as they are introduced to the mold. In additional embodiments, the mold may be set to polymerization conditions after the resin has been introduced to the mold. Examples include heating the mold to a polymerization temperature after a portion or all of the resin has been introduced to the mold.

After polymerization of the second reactive thermoplastic resin is complete, the fiber-reinforced composite article may be removed from the mold 108. In some embodiments, the article may be released from the mold in finished form, while in additional embodiments the article may undergo one or more additional finishing steps. These finishing steps may include sanding rough edges and/or surfaces, thermally annealing the article, and applying paint, lacquer, and/or other coating materials to the outer surfaces of the article.

The mold itself may be constructed of a material that retains its structural integrity under the polymerization conditions, and does not react or irreversibly bond with the fiber-reinforced composite article. Exemplary mold materials include metals, plastics, and ceramics, among other materials. The inside surface of the mold that comes in contact with the pre-impregnated fiber-containing thermoplastic material and the second reactive thermoplastic resin may include an anti-bonding and/or release film, coating, and/or layer to facilitate the extraction of the article from the mold.

The mold may include removable sections such as removable top and bottom sections. The top section may be positioned to form the top of the mold and the top and bottom sections may be locked or otherwise tightly secured to other peripheral sections of the mold such as its sides. An exemplary mold may include one or more valved ingress ports that allow the introduction of the second reactive thermoplastic resin to the mold. A mold may also include one or more gas egress vents that allow air and other gases to be removed from the mold as it fills with the liquid second reactive thermoplastic resin. It may also include a vacuum egress port that can be used to evacuate air and other gases from the mold before or during the introduction of the resin.

Figure 2:
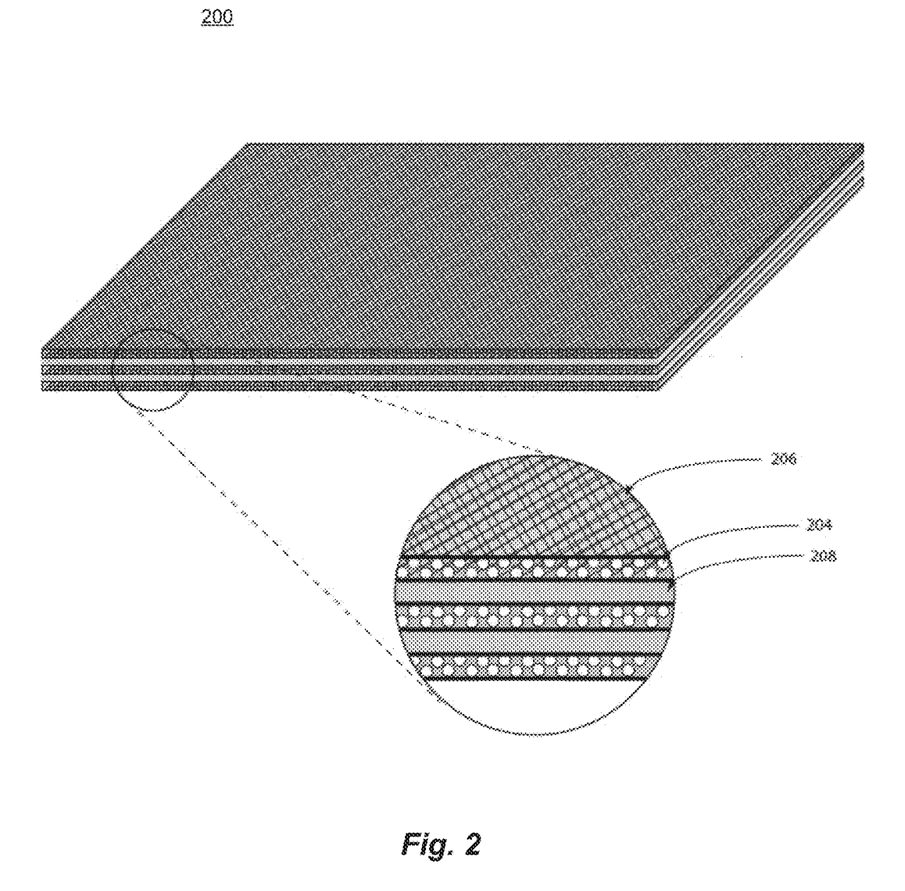
FIG. 2 shows a simplified cross-section of an exemplary fiber-reinforced composite according to embodiments of the invention.

FIG. 2 shows a simplified cross-section of an exemplary fiber-reinforced composite 200 according to the present embodiments. The fiber-reinforced composite 200 represents an example of the material used to make the present fiber reinforced-composite articles (not shown). The cross-section of composite 200 shows fibers 204 in the form of a woven fabric in contact with a first thermoplastic polymer 206. The fibers 204 and first thermoplastic polymer 206 were originally part of a pre-impregnated fiber-containing thermoplastic material provided to a mold for the fiber-reinforced composite article. A second thermoplastic polymer 208 is found in the areas of fiber-reinforced composite article that were not occupied by the pre-impregnated fiber-containing thermoplastic material. The first thermoplastic polymer 206 and the second thermoplastic polymer 208 constitute the polymerized thermoplastic resin matrix that hold the fibers 204 in place and constitute a significant portion of the bulk of the fiber-reinforced composite article.

As illustrated by FIG. 2, the first thermoplastic polymer 206 and the second thermoplastic polymer 208 occupy spatially distinct regions of the polymerized thermoplastic resin matrix. Although the thermoplastic polymers are in spatially distinct regions they are still in contact, and may blend to some extent around the contact interface. In these embodiments (not shown), the fiber-reinforced composite 200 may include one or more blended regions in addition to the spatially distinct regions of the polymerized thermoplastic resin matrix. The blended regions can be found at contact interfaces between the first thermoplastic polymer 206 and the second thermoplastic polymer 208 where the two polymers mix and have blended. In most instances, the blended region represents a physical mixing of the separate thermoplastic polymers instead of a chemical combination like one would expect from the co-polymerization of the monomers from each of the thermoplastic polymers.

The extent of blending at contact interfaces between first and second thermoplastic polymers may depend in part on whether the temperature of the polymerization to form the second thermoplastic polymer 208 is at or above the melting point of the first thermoplastic polymer 206. When the second thermoplastic polymer 208 forms at or above the melting point of the first thermoplastic polymer 206, there is a greater chance the fluid states of the polymers will cause intermixing and blending where they interface. On the other hand, when the second thermoplastic polymer 208 is formed below that melting point, the first thermoplastic polymer 206 remains solid and less prone to mixing with the second thermoplastic polymer 208. In additional embodiments, the extent of blending at contact interfaces between first and second thermoplastic polymers may depend on the solubility of the first thermoplastic polymer in the second reactive thermoplastic resin. When the first thermoplastic polymer has some solubility in the second reactive thermoplastic resin, the two thermoplastic polymers may be fusion bonded at the interfaces.

As noted above, the fibers 204 in the fiber-reinforced composite 200 may include a single type of fiber or two or more types of fibers. Exemplary types of fibers include glass fibers, ceramic fibers, carbon fibers, metal fibers, mineral fibers, and organic polymer fibers, among other types of fibers. The fibers 204 may be chosen from one or more of these types of fibers. Exemplary glass fibers may include "E-glass", "A-glass", "C-glass", "S-glass", "ECR-glass" (corrosion resistant glass), "T-glass", and fluorine and/or boron-free derivatives thereof. Exemplary ceramic fibers may include aluminum oxide, silicon carbide, silicon nitride, silicon carbide, and basalt fibers, among others. Exemplary carbon fibers may include graphite, semi-crystalline carbon, and carbon nano tubes, among other types of carbon fibers. Exemplary metal fibers may include aluminum, steel, and tungsten, among other types of metal fibers. Exemplary organic polymer fibers may include poly aramid fibers, polyester fibers, and polyamide fibers, among other types of organic polymer fibers.

The fibers 204 may range in size and shape from chopped fibers to long fibers, continuous fibers, rovings, and wound fibers, among others. In some embodiments, the fibers 204 are treated with a sizing composition that can enhance the fibers' physical characteristics in a number of ways including increased hardness, increased mechanical strength, greater wettability, and increased adhesion between the fibers and resin. The sizing composition may also enhance the chemical reactivity of the fibers by providing them with reactive agents that initiate and/or promote the polymerization of the resin composition that comes in contact with the "reactive" fibers. The reactive agents may include coupling-activator compounds that include a silicon-containing moiety that forms a covalent bond with an exposed surface of the glass fiber, and an activator moiety that initiates a polymerization reaction in the resin composition that comes in contact with the coupling-activator compound bound to the glass fiber. In some embodiments, this activator moiety is a caprolactam blocked isocyanate moiety that initiates a ring-opening polymerization of lactam when the reactive fibers come in contact with lactam monomers in the resin composition. Exemplary reactive glass fibers are described in co-assigned U.S. Pat. Nos. 8,962,735, and 8,791,203; and U.S. Pat. Pub. Nos. US 2013/0161859 and US 201310164449, all filed Dec. 22, 2011; U.S. Pat. Pub. US 2014/0256201, filed Mar. 7, 2013; and U.S. Pat. Pub. US 2015/0148498, filed Nov. 22, 2013. The entire contents of all the patents and published applications are herein incorporated by reference for all purposes.

Also noted above, the first thermoplastic polymer 206 and the second thermoplastic polymer 208 may be the same or different thermoplastic polymers made from the same or different reactive thermoplastic resins. Examples of the first thermoplastic polymer 206 include polymers made from a first reactive thermoplastic resin, where the resin includes monomeric and/or oligomeric reactants such as lactam monomers (e.g., caprolactam, laurolactam, etc.) to make polyamide polymers, cyclic butylene terephthalate (CBT) oligomers to make polybutylene terephthalate (PBT), and methyl methacrylate (MMA) to make polymethyl methacrylate (PMMA), among other monomeric and/or oligomeric reactants. Examples of the second thermoplastic polymer 208 include thermoplastic polymers made from a reactive thermoplastic resin of polymer reactants such as lactam monomers (e.g., caprolactam, laurolactam, etc.) to make polyamide polymers, cyclic butylene terephthalate (CBT) oligomers to make polybutylene terephthalate (PBT), and methyl methacrylate (MMA) to make polymethyl methacrylate (PMMA), among other monomeric and/or oligomeric reactants. Additional details about some of these exemplary polymers systems will now be described.

Exemplary Reactive Thermoplastic Polymer Compositions

1. Polyamides from Lactam Monomers

Polyamides such as polyamide-6 and polyamide-12, among other polyamides, may be made using a reactive thermoplastic resin of lactam monomers. Exemplary lactam monomers include caprolactam, which can be used to make polyamide-6, and laurolactam, which can be used to make polyamide-12. In the case of caprolactam, the primary reactant in the reactive thermoplastic resin is the caprolactam monomer, a cyclic amide of caproic acid with an emperical formula $(CH_2)_5C(O)NH$, which may be represented by the structural formula:

Caprolactam

In the case of laurolactam, the primary reactant in the reactive thermoplastic resin is the laurolactam monomer, a cyclic amide where the heterocyclic ring includes 12 carbon atoms ($C_{12}H_{23}NO$), which may be represented by the structural formula:

Laurolactam

Caprolactam especially has a low melting point of approximately 69° C. and a melt viscosity (4-8 cP) that is close to water, making it well suited for wetting and mixing with glass fibers. There is also a significant gap between a caprolactam resin's melting temperature (e.g., about 70° C. to about 120° C.) and its polymerization temperature (e.g., about 120° C. to about 220° C.). This reduces the amount of undesired pre-mature polymerization of a caprolactam-containing reactive thermoplastic resin before its introduced to fibers as a liquid melt and then polymerized after through intermixing with the fibers.

Lactam-containing reactive thermoplastic resins may also include polymerization agents such a a polymerization activator and/or a polymerization catalyst. For example, caprolactam-containing reactive thermoplastic resins may include polymerization agents such as a caprolactam polymerization catalyst. Exemplary caprolactam polymerization catalysts may include a salt of a lactam, and the salt may be an alkali metal salt, an alkali-earth metal salt, and/or a Grignard salt of the caprolactam. For example the polymerization catalyst may be an alkali metal salt of caprolactam, such as sodium caprolactam. In another example, the polymerization catalyst may be a Grignard salt of the caprolactam, such as a magnesium bromide salt of the caprolactam. If reactive fibers are used, polymerization agents may also be present on the fibers, and in some instances a polymerization agent may be present in both the reactive thermoplastic resin and on the reactive fibers.

2. Polyacrylates from Acrylate Monomers

Polyacrylate thermoplastic polymers may be made using reactive thermoplastic resins that include one or more acrylate monomers represented by the structural formula:

Acrylate Monomer

Where $R_1$ and $R_2$ are independently a hydrogen, or a $C_1$-$C_6$ alkyl group. For example, when both $R_1$ and $R_2$ are a $C_1$ alkyl group (i.e., a methyl group) the acrylate monomer is the above-described methyl methacrylate. In another example, when the $R_1$ group is a $C_1$ alkyl group and the $R_2$ group is a $C_2$ alkyl group, the acrylate monomer is ethyl methacrylate.

A reactive thermoplastic resin that includes reactants of methyl methacrylate (MMA) monomer may be polymerized into a polymethyl methacrylate (PMMA) thermoplastic polymer. Methyl methacrylate may be represented by the structural formula:

Methyl Methacrylate

A reactive thermoplastic resin of MMA may be introduced to the mold at a temperature of about 40° C. to about 100° C. In some embodiments the reactive thermoplastic resin may also include a polymerization initiator (e.g., an organic peroxide compound) that initiates the polymerization of the MMA into PMMA. In additional embodiments, the polymerization initiator and other polymerization promoters may be introduced separately from the MMA-containing reactive thermoplastic resin, for example from a separate reactant container. The polymerization initiator may be introduced before, during, or after the introduction of the MMA to the mold. Exemplary polymerization initiators may include organic peroxides (e.g., benzoyl peroxide sold under the tradename Luperox® EZ-FLO from Arkema Inc., an aqueous benzoyl peroxide suspension).

3. Macrocyclic Polyesters from Polyalkylene Terephthalate Oligomers

Macrocyclic polyesters such as polybutylene terephthalate (PBT) and polyethylene terephthalate (PET), among other polyesters, may be made using reactive thermoplastic resin of cyclic alkylene terephthalate oligomers such as cyclic butylene terephthalate (CBT). An exemplary CBT oligomer reactant is illustrated below:

Exemplary Cyclic Butylene Terephthalate

It should be appreciated that the present CBT may include additional butylene terephthalate units incorporated into the ring. It should also be appreciated that some exemplary CBT may have other moieties coupled to the CBT ring. CBT may comprise a plurality of dimers, trimers, tetramers, etc., of butylene terephthalate.

Reactive thermoplastic resins that include CBT oligomers are typically solids at room temperature (e.g., about 20° C.), and begin to melt at around 120° C. At around 160° C., CBTs are generally fully melted with a liquid viscosity of about 150 centipoise (cP). As the molten CBTs are heated further, the viscosity may continue to drop, and in some instances may reach about 30 cP at about 190° C. The CBT oligomers may be selected to have a melting temperature range of, for example, 120-190° C. Polymerization temperatures for CBT are typically above 180° C.

CBT-containing thermoplastic reactive resins may be introduced to fibers as a melt. The reactive thermoplastic resin may include additional compounds such as polymerization catalysts, polymerization promoters, thickeners, dispersants, colorants, surfactants, flame retardants, ultraviolet stabilizers, and fillers including inorganic particles and carbon nanotubes, among other additional compounds. When the reactants of the reactive thermoplastic resin include oligomers of a CBT, a polymerization catalyst is selected to drive the polymerization of these types of macrocyclic oligoesters. Exemplary polymerization catalysts may include organometallic compounds such as organo-tin compounds and/or organo-titanate compounds. Exemplary organo-tin catalysts include monoalkyl tin(IV) hydroxide oxides, monoalkyl tin(IV) chloride dihydroxides, dialkyl tin(IV) oxides, bistrialkyl tin(IV) oxides, monoalkyl tin(V) tris-alkoxides, dialkyl tin(IV) dialkoxides, and trialkyl tin (IV) alkoxides, among other tin-containing compounds. Exemplary organo-titanate catalysts include titanate tetraalkoxide compounds and tetraalkyl titanate compounds (e.g., tetra(2-ethylhexyl) titanate), among others. One specific polymerization catalyst for CBT oligomers is butyltin chloride dihydroxide.

The CBT-containing reactive thermoplastic resin may also include a polymerization promoter that accelerates the polymerization rate of the oligomers. The polymerization promoter may by an alcohol and/or epoxide compound. Exemplary alcohols may include one or more hydroxyl groups, such as mono-alcohols (e.g., butanol), diols (e.g., ethylene glycol, 2-ethyl-1,3-hexanediol, bis(4-hydroxybutyl)terephthalate), triols, and other polyols. Exemplary epoxides may include one or more epoxide groups such as monoepoxide, diepoxide, and higher epoxides, such as bisphenol A diglycidylether. They may also include polyol and polyepoxides, such as poly(ethylene glycol).

Embodiments of reactive thermoplastic resins containing CBT reactants may keep the reactants separate from any polymerization catalyts, and/or promoters, until the resin is introduced to the mold or applied to the fibers. This is because many CBT reactants have melting temperatures (e.g., about 150° C. to about 190° C.) that are close to or overlap with the polymerization temperatures (e.g., about 180° C. to about 220° C.). Separating the reactants from the polymerization catalysts, and/or promoters can significantly extend the shelf life of a CBT-containing reactive thermoplastic resin as well as reduce the risk of premature polymerization.

In still additional embodiments, premature polymerization or undesired mixing of the catalyst and macrocyclic polyester oligomer may be avoided by separately applying the catalyst to the reinforcing fibers, and adding little or no catalyst to the oligomer. The catalyst may be applied to the reinforcing fibers as part of a sizing package. Exemplary methods of applying the catalyst to the reinforcing fibers are described in co-assigned U.S. patent application Ser. No. 12/913,326, filed Oct. 27, 2010, entitled "Fibers Treated With Polymerization Compounds and Fiber Reinforced Composites Made Therefrom", the entire disclosure of which is hereby incorporated by reference for all purposes.

4. Thermoplastic Polyurethanes (TPUs)

Thermoplastic polyurethanes (TPUs) may be made using reactive thermoplastic resins that include pre-polymers that have isocyanate end groups (NCO) and curatives. Typically, the prepolymer is synthesized by reacting a long chain polyol with diisocyanate to form a molecule with reactive isocyanate groups on both chain ends. Long chain polyols of the polyether type and polyester type may be used to make prepolymers.

The reactant prepolymers in the reactive thermoplastic resins can be cured by the inclusion of a wide variety of curatives to form the TPU thermoplastic polymer. The choice of curatives depends on the required physical and chemical properties, processing and curing conditions. Typical curatives for TPUs are difunctional, such as diamines, diols, and hydroxy amines. The reaction between prepolymer and curative forms urethane links (in the case of diol curative) or urea links (in the case of diamine curative).

Isocyanate functionalities in the prepolymers are very reactive, and will react readily with hydroxyl or amino groups on curative molecules. Therefore the mixture of prepolymer and curative has limited pot life. In the conventional process of casting thermoplastic polyurethane, it is often required that the prepolymer-curative mixture to be prepared right before they are used for casting. The limited pot life of the prepolymer-curative mixture limits the processing window of composite manufacturing processes. Therefore, the embodiments of the present invention include a two-tank system to separate the prepolymer reactants from the curatives in two tanks, before they mixed and applied as a reactive thermoplastic resin to fibers or the mold, addressing the problem of short pot life for these reactive thermoplastic resins.

EXAMPLES

Wind Turbine Blade Made From Glass-Fiber Reinforced PA-6 and PMMA Composite

Figure 3:
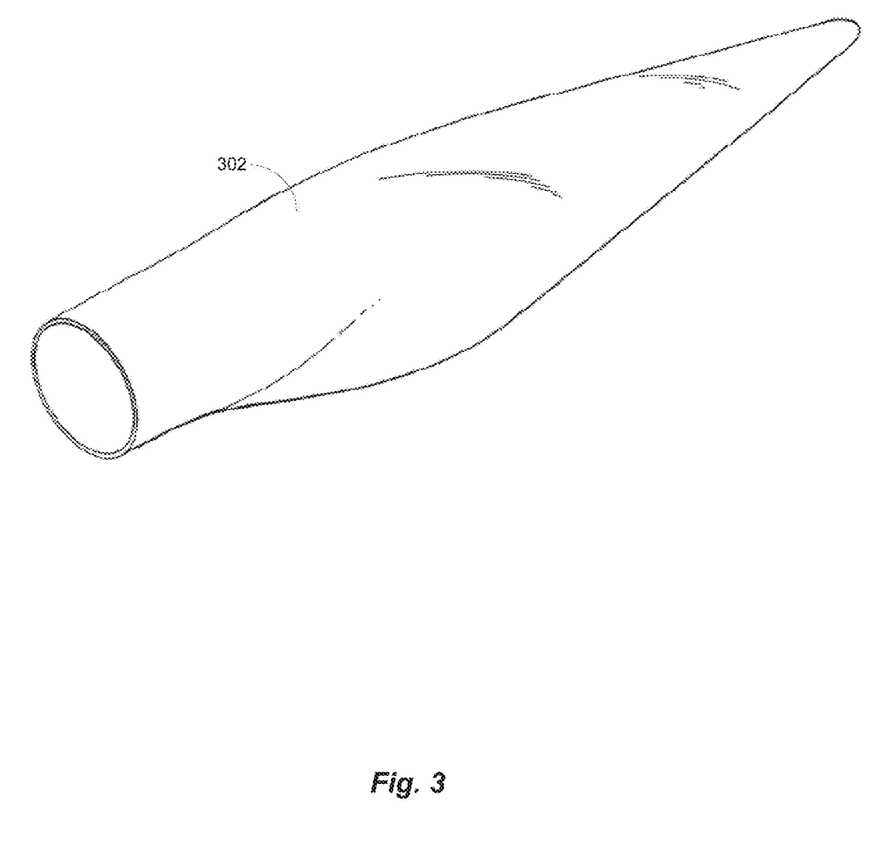
FIG. 3 shows a simplifed drawing of a wind turbine blade according to embodiments of the invention.

This example illustrates the production of a wind turbine blade (a fiber-reinforced composite article) that may include glass fibers, a first thermoplastic polymer region of polyamide-6 (PA-6), and a second thermoplastic polymer region of polymethyl methacrylate (PMMA). FIG. 3 shows a simplifed drawing of an embodiment of such a wind turbine blade 302. Production of the wind turbine blade may include preparing a pre-impregnated glass-fiber containing PA-6 material that will be provided to the mold for the wind turbine blade. The pre-impregnated material may be produced by heating a glass fabric or mat to a temperature that efficiently removes the moisture from the fabric or mat (e.g., 100° C.-175° C.). Dry nitrogen may be blown onto the glass fabric or mat during the application of the reactive PA-6 resin reactants that include the caprolactam to prevent moisture in the ambient atmosphere from absorbing on the glass fibers and reactants. The nitrogen purging processes may be used to control the moisture content in the reactive PA-6 resin intermixed with the glass fibers to about 200 part-per-million (ppm) or less. Additional details about making pre-impregnated fiber-containing PA-6 material can be found in co-assigned U.S. patent application Ser. No. 14/794,634, filed Jul. 8, 2015, the entire contents of which are herein incorporated by reference for all purposes.

A reactive PA-6 resin may be applied to the glass mat at a temperature above the melting temperature of caprolactam and below the polymerizaton temperature of the resin. The reactive PA-6 resin may include caprolactam, sodium caprolactamate as a polymerization catalyst catalyst, and N-acetylcaprolactam as a polymerization activator. Prior to application on the glass fabric or mat, the reactive PA-6 resin was stored in two heated tanks which kept molten caprolactam and the sodium caprolactamate catalyst in a first tank separate from additional molten caprolactam and N-acetylcaprolactam activator in a second tank. The liquids from each tank were mixed in a 1:1 ratio with a static mixer before being applied as the reactive PA-6 resin to the glass fiber fabric or mat. The reactive PA-6 resin may be applied to the glass fabric or mat at a temperature ranging of about 70° C.-120° C., where the glass fabric or mat itself may have a comparable temperature following the heat treatment to remove moisture. Because the viscosity of the reactive PA-6 resin is comparable to liquid water (i.e., less than 10 cps), the resin quickly impregnate the glass fibers to form a pre-polymerized amalgam.

The amalgam is then transported by a double belt press oven that uses two teflon-coated belts to press and polymerize the amalgam into the pre-impregnated glass-fiber containing PA-6 material. The polymerization temperature in the oven may range from about 120° C.-220° C. (e.g., 160° C.) and the polymerizing amalgam may reside in the oven for 1 to 20 minutes (e.g., about 3.0 minutes). The entire process of forming the pre-impregnated glass-fiber containing PA-6 material typically takes 20 minutes or less, in some embodiments 10 minutes or less, and in additional embodiments 5 minutes or less.

The pre-impregnated fiber-containing PA-6 material may then be placed into a mold. The fiber-containing PA-6 material may be pre-cut, shaped and stacked to fit and fill the inside the mold. During the placement of the PA-6 material, the mold may be disassembled into parts for better accessability. For example, the mold may have a top and bottom section that can be taken apart and each separately filled with the pre-impregnated fiber-containing PA-6 material.

After the PA-6 material fills the section of the mold, the reactive methyl methacrylate (MMA) resin may be introduced to the mold. The reactive MMA resin may include PMMA polymer mixed in with the MMA monomer in order to reduce the shrinkage of the polymerized article as the MMA increases in density from about 0.9 g/cm$^3$ to about 1.2 g/cm$^3$ when polymerized into PMMA.

There is a one tank and two tank option for supplying the reactive MMA resin to the mold. The one tank option pre-mixes the MMA monomers with a benzoyl peroxide polymerization initiator and keeps the mixture is kept at a lower temperature (e.g., less than 40° C.) to prevent premature polymerization. The two tank option separates the MMA monomer separate from the benzoyl peroxide polymerization initiator in separate tanks and combines them immediately before their introduction to the mold. The MMA and polymerization initiator can be stored at higher temperature with the two tank option.

Additional fibers may be added in the mold, before the reactive MMA resin is introduced into the mold. The reactive MMA resin may also be pre-mixed with additional fibers before introducing the resin-fiber mixture to the mold. The fibers may be sized with a reactive coupling agent that promotes the chemical bonding of the MAA to the reactive fibers. These reactive coupling agents may include silane coupling agents that have a methacryalate moiety that copolymerizes with MMA during the polymerization, therefore improving fiber-matrix bonding.

As either a one-part or two-part reactive MMA resin, the resin may be introduced through valved injection ports in the mold positioned at desired locations in the mold periphery. The mold also includes egress ports that permit air and other gases to be removed from the mold as the reactive MMA resin fills the open spaces in the PA-6 material and other open regions inside the mold. In some instances, the egress ports may be connected to a vacuum pump that evacuates gases inside the mold and speeds the transport of the liquid reactive MMA resin into the mold.

Once the reative MMA resin has filled the mold, it may be maintained at a polymerization temperature of about 40° C.-100° C. until the polymerization to PMMA is complete. Maintaining the polymerization temperature in the mold is aided by the significantly exothermic polymerization of MMA into PMMA. Because the amounts of reactive MMA resin is reduced by the presence of the pre-impregnated fiber-containing PA-6 material, and because the pre-impregnated fiber-containing PA-6 material absorbs some of the heat of reaction of the MMA, cooling equipment around the mold is normally not required. The heat may also soften the PA-6 to create a stronger bond between the PA-6 and PMMA regions of the final wind turbine blade.

After the polymerizaton of the reactive MMA resin is complete, the wind turbine blade may be removed from the mold. The wind turbine blade may undergo one or more finishing steps such as sanding rough edges and/or surfaces, thermal annealing, and applying paint, lacquer, and/or other coating materials to the outer surfaces of the blade.

Vehicle Part Made from Glass-Fiber Reinforced PMMA Composite

Figure 4:
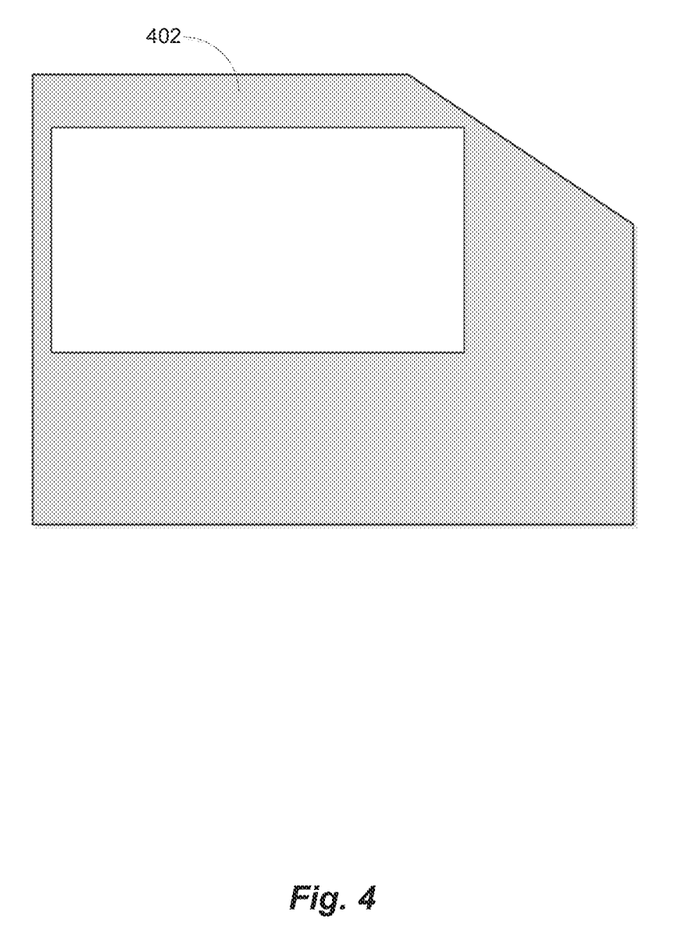
FIG. 4 shows a simplified drawing of a vehicle panel according to embodiment of the invention.

This example illustrates the production of an exterior automobile panel (a fiber-reinforced composite article) that may include glass fibers, a first thermoplastic polymer region of polymethyl methacrylate (PMMA), and a second thermoplastic polymer region also made of PMMA. FIG. 4 shows a simplifed drawing of an embodiment of such a exterior automobile panel 402. Production of the panel may include preparing a pre-impregnated glass-fiber containing PMMA material that will be provided to the mold for the panel. The pre-impregnated material may be produced by contacting a glass fabric or mat with a reactive methyl methacrylate (MMA) resin that has been heated to a temperature of 40-100° C. and combined with an aqueous benzoyl peroxide suspension (e.g., Luperox® EZ-FLO from Arkema, Inc.) immediately before contacting the glass fabric or mat. The benzoyl peroxide may be added at 3-5 wt. % of the MMA monomers. After contact the low-viscosity reactive MMA resin quickly soaks the glass fibers, filling in open spaces between the fibers to form an amalgam of the reactive MMA resin and the glass fabric or mat. Additional details about making pre-impregnated fiber-containing PMMA material can be found in co-assigned U.S. patent application Ser. No. 14/845,007, filed Sep. 3, 2015, the entire contents of which are herein incorporated by reference for all purposes.

In some instances the plurality of glass fibers may be reactive fibers treated (e.g., sized) with one or more PMMA coupling agents that strengthen the bonding between the PMMA and the fibers. The example of the coupling agents may include silane coupling agents comprising at least one ethylenically unsaturated moiety (e.g., silane coupling agents that have a methacrylate moiety that co-polymerizes with MMA during the polymerization).

The amalgam is then transported by a double belt press oven that uses two teflon-coated belts to press and polymerize the amalgam into the pre-impregnated glass-fiber containing PMMA material. The polymerization temperature in the oven may range from about 40° C.-100° C. (e.g., 70° C.) and the polymerizing amalgam may reside in the oven for 1 to 20 minutes (e.g., about 5.0 minutes). The entire process of forming the pre-impregnated glass-fiber containing PMMA material typically takes 20 minutes or less, in some embodiments 10 minutes or less, and in additional embodiments 5 minutes or less.

The pre-impregnated fiber-containing PMMA material may then be placed into a mold. The fiber-containing PMMA material may also be pre-cut, shaped and stacked to fit and fill the inside of the mold. During the placement of the PMMA material, the mold may be disassembled into parts for better accessability. For example, the mold may have a top and bottom section that can be taken apart and each separately filled with the pre-impregnated fiber-containing PMMA material.

After the PMMA material fills the section of the mold, a liquid reactive methyl methacrylate (MMA) resin may be introduced to the mold. The reactive MMA resin may include PMMA polymer mixed in with the MMA monomer in order to reduce the shrinkage of the polymerized article as the MMA increases in density from about 0.9 g/cm$^3$ to about 1.2 g/cm$^3$ when polymerized into PMMA.

There is a one tank and two tank option for supplying the reactive MMA resin to the mold. The one tank option pre-mixes the MMA monomers with a benzoyl peroxide polymerization initiator and keeps the mixture is kept at a lower temperature (e.g., less than 40° C.) to prevent premature polymerization. The two tank option separates the MMA monomer separate from the benzoyl peroxide polymerization initiator in separate tanks and combines them immediately before their introduction to the mold. The MMA and polymerization initiator can be stored at higher temperature with the two tank option.

Additional fibers may be added in the mold, before the reactive MMA resin is introduced into the mold. The reactive MMA resin may also be pre-mixed with additional fibers before introducing the resin-fiber mixture to the mold. The fibers may be sized with a reactive coupling agent that promotes the chemical bonding of the MAA to the reactive fibers. These reactive coupling agents may include silane coupling agents that have a methacryalate moiety that co-polymerizes with MMA during the polymerization, therefore improving fiber-matrix bonding.

As either a one-part or two-part reactive MMA resin, the resin may be introduced through valved injection ports in the mold positioned at desired locations in the mold periphery. The mold also includes egress ports that permit air and other gases to be removed from the mold as the reactive MMA resin fills the open spaces in the pre-impregnated PMMA material and other open regions inside the mold. In some instances, the egress ports may be connected to a vacuum pump that evacuates gases inside the mold and speeds the transport of the liquid reactive MMA resin into the mold.

Once the reative MMA resin has filled the mold, it may be maintained at a polymerization temperature of about 40° C.-100° C. until the polymerization of the added MMA resin is complete. Maintaining the polymerization temperature in the mold is aided by the significantly exothermic polymerization of MMA into PMMA. Because the amounts of reactive MMA resin are reduced by the presence of the pre-impregnated fiber-containing PMMA material, and because the pre-impregnated fiber-containing PMMA material absorbs some of the heat of reaction of the MMA, cooling equipment around the mold is normally not required. The heat may also soften or even melt the PMMA to create a stronger bond between the PMMA from the pre-impregnated fiber-containing material and the PMMA regions formed by the addition of the reactive MMA resin to the mold.

After the polymerizaton of the reactive MMA resin is complete, the vehicle panel may be removed from the mold. The panel my undergo one or more finishing steps such as sanding rough edges and/or surfaces, thermal annealing, and applying paint, lacquer, and/or other coating materials to the outer surfaces of the panel.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the polymer" includes reference to one or more polymers and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A method of making a fiber reinforced composite article, the method comprising
   providing a pre-impregnated fiber-containing thermoplastic material to a mold, wherein the pre-impregnated fiber-containing thermoplastic material comprises:
   (i) a plurality of fibers, and
   (ii) a first thermoplastic polymer made from a first reactive thermoplastic resin;
   introducing reactants of a second reactive thermoplastic resin to the mold, wherein the reactants fill open spaces in the mold that are left by the pre-impregnated fiber-containing thermoplastic material; and
   polymerizing the second reactive thermoplastic resin to form a second thermoplastic polymer.

2. The method of claim 1, wherein the pre-impregnated fiber-containing thermoplastic material comprises a fibrous substrate of the plurality of fibers impregnated with the first thermoplastic polymer made from the first reactive thermoplastic resin.

3. The method of claim 1, wherein the plurality of fibers are chosen from glass fibers, carbon fibers, mineral fibers, and organic polymer fibers, and combinations thereof.

4. The method of claim 1, wherein the plurality of fibers are glass fibers chosen from E-glass, A-glass, C-glass, S-glass, ECR-glass, and T-glass.

5. The method of claim 1, wherein the plurality of fibers comprise one or more of chopped fibers, continuous fibers, rovings, or wound fibers.

6. The method of claim 1, wherein the first thermoplastic polymer and the second thermoplastic polymer are the same.

7. The method of claim 1, wherein the first thermoplastic polymer and the second thermoplastic polymer are different.

8. The method of claim 1, wherein the first thermoplastic polymer is chosen from a polyamide polymer, a polybutylene terephthalate polymer, a polymethyl methacrylate, and a polycycloolefin.

9. The method of claim 8, wherein the first thermoplastic polymer comprises the polyamide polymer made from one or more reactive lactam monomers.

10. The method of claim 9, wherein the polyamide polymer is chosen from polyamide 6, polyamide 12, a copolymer of caprolactam and laurolactam, and a blend of polyamide 6 and polyamide 12.

11. The method of claim 9, wherein the reactive lactam monomer is chosen from caprolactam, laurolactam, and a combination of caprolactam and laurolactam.

12. The method of claim 8, wherein the first thermoplastic polymer comprises polymethyl methacrylate made from a methyl methacrylate monomer.

13. The method of claim 8, wherein the first thermoplastic polymer comprises the polybutylene terephthalate made from one or more cyclic butylene terephthalate oligomers.

14. The method of claim 1, wherein the reactants for the second reactive thermoplastic resin comprise methyl methacrylate.

15. The method of claim 14, wherein the second thermoplastic polymer comprises polymethyl methacrylate.

16. The method of claim 1, wherein the second thermoplastic polymer comprises a polyamide made from one or more reactive lactam monomers.

17. The method of claim 1, wherein the second thermoplastic polymer comprises polybutylene terephthalate made from one or more cyclic butylene terephthalate oligomers.

18. The method of claim 1, wherein the method comprises adding additional fibers to the mold before introducing the reactants of the second reactive thermoplastic resin to the mold.

19. The method of claim 18, wherein the additional fibers are chosen from woven fabrics, nonwoven mats, and combinations thereof.

20. The method of claim 1, wherein the method further comprises mixing the reactants of the second reactive thermoplastic resin with additional fibers before introducing the reactants to the mold.

21. The method of claim 1, wherein the fiber-reinforced composite article comprises a vehicle part or a turbine blade.

22. A method of making a fiber-reinforced thermoplastic composite article, the method comprising:
   providing a pre-impregnated fiber-containing thermoplastic material to a mold, wherein the pre-impregnated fiber-containing thermoplastic material comprises:
   (i) a plurality of glass fibers, and
   (ii) a polyamide polymer made from a reactive lactam resin;
   introducing reactants of a reactive thermoplastic resin to the mold, wherein the reactants fill open spaces in the mold that are left by the pre-impregnated fiber-containing thermoplastic material; and polymerizing the reactive thermoplastic resin to form a thermoplastic polymer.

23. The method of claim 22, wherein the reactants for the reactive thermoplastic resin comprise one or more acrylate monomers.

24. The method of claim 23, wherein the one or more acrylate monomers are chosen from alkylacrylate monomers and alkyl methacrylate monomers.

25. The method of claim 24, wherein the alkyl methacrylate monomer comprises methyl methacrylate.

26. The method of claim 22, wherein the reactants of the reactive thermoplastic resin comprise one or more reactive lactam monomers.

27. The method of claim 22, wherein the reactants of the reactive thermoplastic resin comprise one or more cyclic butylene terephthalate oligomers.

28. The method of claim 22, wherein the method comprises adding additional fibers in the mold before introducing the reactants of the reactive thermoplastic resin to the mold.

29. The method of claim 28, wherein the additional fibers are chosen from woven fabrics, nonwoven mats, and combinations thereof.

30. The method of claim 22, wherein the method comprises mixing the reactants of the reactive thermoplastic resin with additional fibers before introducing the reactants to the mold.

31. The method of claim 22, wherein the polyamide polymer is chosen from polyamide 6, polyamide 12, a copolymer of caprolactam and laurolactam, and a blend of polyamide-6 and polyamide-12.

32. The method of 22, wherein the pre-impregnated fiber-containing thermoplastic material is formed by:
providing a fibrous substrate made from the plurality of glass fibers, wherein the plurality of glass fibers are reactive glass fibers;
applying the reactive lactam resin to the fibrous substrate to form a fiber and resin amalgam; and
curing the fiber and resin amalgam at a polymerization temperature for the reactive lactam resin to form the pre-impregnated fiber-containing thermoplastic material.

33. The method of claim 22, wherein the pre-impregnated fiber-containing thermoplastic material is chosen from prepregs, unidirectional tapes, pultruded rods, and combinations thereof.

34. The method of claim 33, wherein the prepregs comprise woven fabrics pre-impregnated with a polyamide polymer made from one or more reactive lactam monomers.

35. The method of claim 34, wherein the one or more reactive lactam monomers are chosen from caprolactam, laurolactam, and a combination of caprolactam and laurolactam.

36. The method of claim 32, wherein the reactive glass fibers are sized with a coupling-activator compound that improves bonding of the plurality of glass fibers to the polyamide polymer.

37. A method of making a fiber-reinforced thermoplastic composite article, the method comprising:
providing a pre-impregnated fiber-containing thermoplastic material to a mold, wherein the pre-impregnated fiber-containing thermoplastic material comprises:
(i) a plurality of glass fibers, and
(ii) a polymethyl methacrylate polymer made from a reactive methyl methacrylate resin;
introducing reactants of a reactive thermoplastic resin to the mold, wherein the reactants fill open spaces in the mold that are left by the pre-impregnated fiber-containing thermoplastic material; and
polymerizing the reactive thermoplastic resin to form a thermoplastic polymer.

38. The method of claim 37, wherein the reactants for the reactive thermoplastic resin comprises methyl methacrylate.

39. The method of claim 37, wherein the reactants of the reactive thermoplastic resin comprise one or more reactive lactam monomers.

40. The method of claim 37, wherein the reactants of the reactive thermoplastic resin comprise one or more cyclic butylene terephthalate oligomers.

41. The method of claim 37, wherein the method comprises adding additional fibers in the mold before introducing the reactants of the reactive thermoplastic resin to the mold.

42. The method of claim 37, wherein the additional fibers are chosen from woven fabrics, nonwoven mats, and combinations thereof.

43. The method of claim 37, wherein the method comprises mixing the reactants of the reactive thermoplastic resin with additional fibers before introducing the reactants to the mold.

44. The method of 37, wherein the pre-impregnated fiber-containing thermoplastic material is formed by:
providing a fibrous substrate made from the plurality of glass fibers, wherein the plurality of glass fibers are reactive glass fibers;
applying the reactive methyl methacrylate resin to the fibrous substrate to form a fiber and resin amalgam; and
curing the fiber and resin amalgam at a polymerization temperature for the reactive methyl methacrylate resin to form the pre-impregnated fiber-containing thermoplastic material.

45. The method of claim 37, wherein the pre-impregnated fiber-containing thermoplastic material is chosen from prepregs, unidirectional tapes, pultruded rods, and combinations thereof.

46. The method of claim 44, wherein the reactive glass fibers are sized with a coupling agent comprising at least one ethylenically unsaturated moiety that improves bonding of the plurality of glass fibers to the polymethyl methacrylate polymer.

* * * * *